UNITED STATES PATENT OFFICE.

JAMES MILLAR NEIL, OF TORONTO, ONTARIO, CANADA, ASSIGNOR TO ALEXANDER M. HAY, OF TORONTO, CANADA.

PROCESS FOR THE PRECIPITATION OF PRECIOUS METALS FROM CYANID SOLUTIONS.

1,023,524.  Specification of Letters Patent.  Patented Apr. 16, 1912.

No Drawing.  Application filed September 5, 1911.  Serial No. 647,734.

*To all whom it may concern:*

Be it known that I, JAMES M. NEIL, of Toronto, in the county of York, Province of Ontario, Canada, have invented certain new and useful Improvements in Processes for the Precipitation of Precious Metals from Cyanid Solutions; and I hereby declare that the following is a full, clear, and exact description thereof.

This invention is an improvement in processes for precipitating precious metals from cyanid solutions, and its object is to expedite the precipitation of the precious metals and recover them more efficiently than has heretofore been done.

Heretofore the ores containing precious metals have been treated with cyanid and the precious metals thereby dissolved in the cyanid solutions and thereafter the precious metals have been precipitated from such solutions in various ways,—commonly by percolation of the solution through zinc shavings, or by adding zinc dust to the solution while in agitation. Zinc dust is an impure powder consisting of more or less metallic zinc and impurities, the latter being inert as precipitating agents.

I have discovered that when atomized lead, in metallic form, and zinc dust are both added to a cyanid solution, in agitation, containing precious metals, the latter are precipitated more rapidly and efficiently than when zinc dust is used alone; and I have further discovered that when atomized lead and atomized zinc are both added, in metallic form, to the cyanid solution in agitation a still more rapid and efficient precipitation of the precious metals takes place.

The means for and method of finely subdividing or atomizing the lead and zinc used in my process is not an essential part of my present invention. By "atomized" lead, or "atomized" zinc I do not refer to metallic lead or zinc in their atomic form as supposed to exist in chemistry, but I mean lead, or zinc, finely subdivided so that it resembles a floury or substantially impalpable powder, yet not oxidized.

In the carrying out of my process atomized metallic lead and zinc dust may be used, but, preferably, in order to obtain the best results, atomized lead and atomized zinc (both in metallic form) should be used, in the proportion of about one part of lead to one or more parts of zinc. These may be mixed and added to the cyanid solution containing the precious metals in such manner as is at present done in the case of zinc dust, or in any other suitable way, but preferably I add them separately as hereinafter described, whereupon an electro-galvanic action is set up between the lead and zinc, producing a rapid and efficient precipitation of the precious metals, the zinc going into solution and replacing the latter, while the lead remaining unaltered, forms part of the precipitates.

In practice when zinc dust is used alone for the precipitation of the precious metals from cyanid solutions, an efficiency of 75% of the zinc used is rarely obtained, whereas by using atomized lead and atomized zinc it is possible to get an efficiency of over 95% of the zinc used, and I have found that the following method is a very simple and effective one to use in the carrying out of my process and invention, and is one whereby efficiencies of 95% and over may be obtained in practice.

The cyanid solution coming from the slimes filter is run into a suitable tank or container provided with an agitating device. After a known quantity of cyanid solution, (the value of the precious metals therein having been previously ascertained by analysis) has been put into the tank, there is then added thereto a quantity of atomized lead; the amount thereof may be varied, but I have found that an economic basis of operation is to supply about one hundred pounds of atomized lead to about ten thousand gallons of cyanid solution. After adding the atomized lead the contents of the tank are thoroughly agitated, and while in agitation I add thereto—preferably gradually or in small quantities at a time.— atomized zinc until the usual tests of the solution show that all of the precious metals therein have been precipitated. Zinc dust may be used in the process instead of the atomized zinc. When the precious metals have been precipitated the contents of the tank are allowed to settle. After allowing the contents of the tank to settle, the clear barren solution is withdrawn from the tank for re-use in the preliminary dissolving tank, and the precipitates may then be removed and the operation repeated; or the tank may again be filled with fresh cyanid solution containing precious metals, without removing the precipitates which contain the lead in metallic form, and the whole again agitated; whereupon zinc either in an atomized or finely divided form or as zinc dust is again added thereto, and the precious metals in the fresh cyanid solution again precipitated in the manner above described without having to replenish the atomized lead. The operation may be repeated on fresh batches of cyanid solution without any additional lead being supplied; until it becomes desirable to remove the lead gold and silver sludge. Such sludge may be separated from the solution by filtration, or by other suitable means, and then refined, the lead contained in the precipitates acting as a valuable agent in the final treatment thereof.

By this process the precipitation of the precious metals is accomplished more rapidly, more efficiently and with less consumption of zinc than by other methods.

I do not herein claim broadly the use of atomized lead in the process of precipitating precious metals from cyanid solutions, as that is covered in my application filed May 27, 1911, Serial No. 629,812; but in the present case I desire to cover the above described novel method or process of treating cyanid solutions with atomized lead and zinc.

What I claim is:

1. The herein described process of precipitating precious metals from cyanid solutions; consisting in adding to the cyanid solution a substance containing atomized lead, agitating the solution and adding thereto a finely divided metallic precipitant.

2. The herein described process of precipitating precious metals from cyanid solutions; consisting in adding to such a solution atomized lead, agitating the solution, and adding thereto a finely divided substance containing zinc.

3. The herein described process of precipitating precious metals from cyanid solutions; consisting in adding to a cyanid solution atomized lead, agitating the solution and while it is in agitation adding thereto atomized zinc.

4. The herein described process of precipitating precious metals from cyanid solutions; consisting in adding to such a solution finely divided lead, agitating the solution, and while it is in agitation successively adding thereto small quantities of a finely divided metallic precipitant, until the precious metals in the solution have been precipitated, then removing the barren solution and recovering the precious metals contained in the precipitates.

5. The herein described process of precipitating precious metals from cyanid solutions; consisting in adding to such a solution a quantity of finely divided lead, agitating the solution and adding thereto a finely divided substance containing zinc until the precious metals in such solution have been precipitated; then removing the barren solution; refilling the tank with fresh cyanid solution one or more times, agitating same, and adding more of the zinc substance until the precious metals in the fresh solution are precipitated, then removing the barren solution and recovering the precious metals contained in the precipitates.

6. The herein described process of precipitating precious metals from cyanid solutions; consisting in adding to such solution a quantity of atomized lead; then agitating the solution and while it is in agitation adding thereto atomized zinc until the precious metals in the solution have been precipitated; then removing the barren solution: refilling the tank with fresh cyanid solution one or more times, agitating same, and adding atomized zinc until the precious metals in the fresh solution are precipitated, then removing the barren solution and recovering the precious metals contained in the precipitates.

In testimony that I claim the foregoing as my own, I affix my signature in presence of two witnesses.

JAMES MILLAR NEIL.

Witnesses:
MARTIN GRAHAM,
LAWRENCE J. PASHLER.